United States Patent [19]
Ohtake et al.

[11] Patent Number: 5,928,100
[45] Date of Patent: Jul. 27, 1999

[54] LUBRICATING PASSAGES FOR A PLANETARY GEAR

[75] Inventors: Isamu Ohtake; Yuji Suzuki; Seiji Matsumoto, all of Fuji, Japan

[73] Assignee: Jatco Corporation, Fuji, Japan

[21] Appl. No.: 08/883,043

[22] Filed: Jun. 26, 1997

[30] Foreign Application Priority Data

Jun. 28, 1996 [JP] Japan .................................. 8-169896

[51] Int. Cl.$^6$ .............................. F16H 1/28; F16H 57/04
[52] U.S. Cl. ........................................................... 475/159
[58] Field of Search ................................... 475/159, 160; 184/6.12

[56] References Cited

U.S. PATENT DOCUMENTS

| | | | |
|---|---|---|---|
| 4,719,818 | 1/1988 | McReary | 475/159 |
| 5,102,379 | 4/1992 | Pagluica et al. | 475/159 X |

FOREIGN PATENT DOCUMENTS

58-8849   1/1983   Japan .

Primary Examiner—Khoi Q. Ta
Attorney, Agent, or Firm—Foley & Lardner

[57] ABSTRACT

A planetary gear has a lower hole which communicates with a radial groove formed in a carrier plate formed at a position near the end portion of an outer peripheral surface of a pinion shaft on a radially inner side thereof. In the inside of the pinion shaft, an internal lubricating oil path is formed which makes an inner wall of the lower hole communicate with an axial center portion of the outer peripheral surface of the pinion shaft on a radially outer side thereof. The lower hole is perforated in an oblique direction with respect to the axis line of the pinion shaft so that a bottom portion of the lower hole is positioned nearer to the end portion than an aperture portion of pinion shaft. The internal lubricating oil path is constituted by a slant oil path, which opens at the inner wall of the lower hole and extends in an oblique direction, and a radial oil path, which opens at the axial center portion of the outer peripheral surface of the pinion shaft on the radially outer side thereof and extends radially to communicate with an end portion of the slant oil path. The axis line of the lower hole is perpendicular to the axis line of the slant oil path.

2 Claims, 6 Drawing Sheets

LUBRICATING PASSAGES FOR A PLANETARY GEAR

BACKGROUND OF THE INVENTION

1. Field of the Invention

The present invention relates to a planetary gear and a method for manufacturing the same, and in particular to a planetary gear including a pinion shaft for supporting a pinion rotatably in which an internal lubricating oil path is perforated into the pinion shaft from an outer peripheral surface obliquely with respect to the axis line.

2. Description of the Related Art

A prior art technique of this kind is disclosed, for example, in Japanese Patent Laid-Open Publication No. 58-8849. Specifically, in this prior art technique, a planetary gear includes a pinion shaft for rotatably supporting a pinion, a planet carrier for holding the pinion shaft and provided rotatably so that the pinion can be revolved, a thrust washer interposed between a carrier plate for supporting the pinion of the planet carrier and an axial end surface of the pinion. Furthermore, an annular groove is formed in an inner peripheral surface of the carrier plate, and a path is formed in a joining surface portion between the carrier plate and the thrust washer so that the path passes through in the vicinity of the pinion shaft and the annular groove, and a through hole is formed within the pinion shaft to extend in an oblique direction so that the the path is communicated with the outside of an outer peripheral surface of the pinion shaft. In such a structure, a lubricating oil path can be formed without increasing the number of parts.

Figure 7:
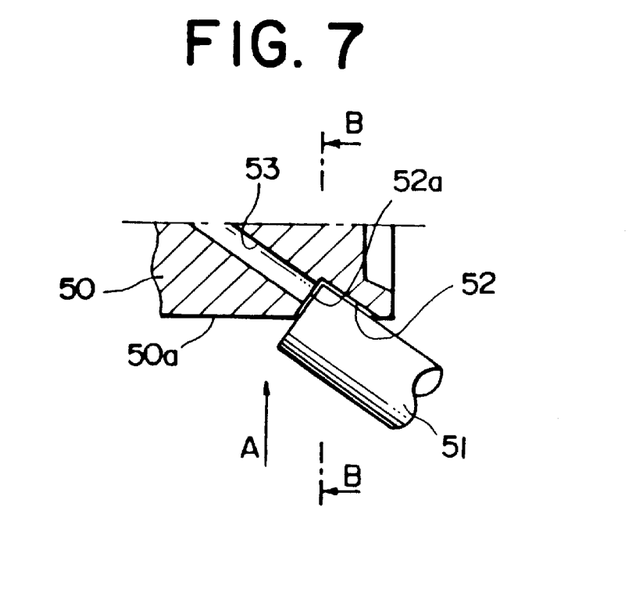
FIG. 7 is sectional view illustrating perforation of a lower hole in the prior art.

In the case of forming the internal lubricating oil path extending in an oblique direction with respect to the axis line of the pinion shaft, by forming an aperture in the outer peripheral surface of the pinion shaft in a similar manner as the through hole within the pinion shaft disclosed in the above-mentioned patent publication, in order to make easy the formation of an internal lubricating oil path having a small diameter, it is general to form a lower hole in the outer peripheral surface of the pinion shaft at a position intended to be an aperture of the internal lubricating oil path so that the lower hole is substantially in parallel with the internal lubricating oil path. Thus, for example, as shown in FIG. 7, a lower hole 52 is perforated into the outer peripheral surface of the pinion shaft 50 at a position near the axial end portion by means of an end mill 51 from an oblique direction so that a bottom portion 52a of the lower hole 52 is located nearer to the axial center portion than the aperture portion. Following this, it is considered to perforate an internal lubricating oil path 53 having a small diameter in an oblique direction by utilizing the bottom portion 52a of the lower hole 52.

Figure 8:
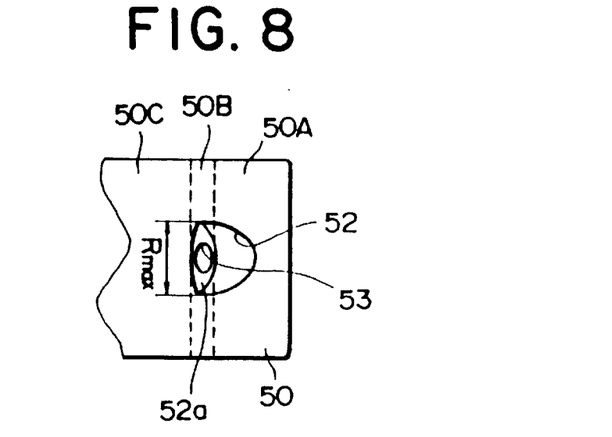
FIG. 8 is a view as viewed in the direction of the arrow A in FIG. 7.

However, in this structure in which the lower hole 52 is formed substantially parallel with the internal lubricating oil path 53, when an end mill 51 having a large diameter is used, as shown in FIG. 8, which is a view as viewed in the direction of the arrow A in FIG. 7, a portion of the lower hole 52 having a maximum diameter Rmax will be positioned near the axial center portion of the pinion shaft 50. On the other hand, the outer peripheral surface of the pinion shaft 50 may be divided into the following three areas from the axial end surface side as shown in FIG. 8: a holding area 50A held by the carrier plate, a washer sliding area 50B around which the thrust washer is fitted slidably, and a bearing area 50C around which a bearing is fitted to make the pinion rotatable. Furthermore, it is required that lubricating oil be fed into the the lower hole 52. Since it is easy to form an oil path in the carrier plate, the lower hole 52 is apt to be formed near the holding area 50A.

Figure 9:
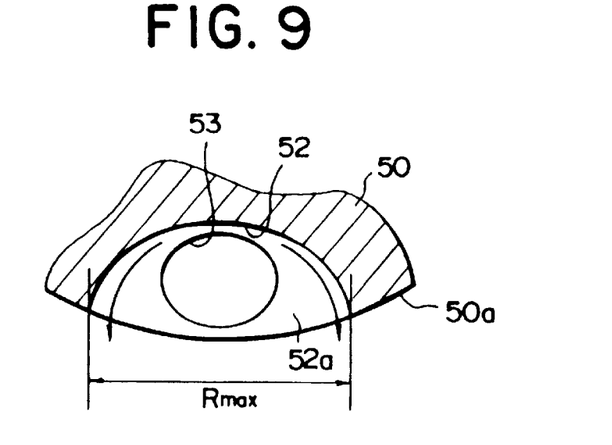
FIG. 9 is a sectional view taken along the line 9—9 in FIG. 7.

Then, the portion of the lower hole 52 having the maximum diameter Rmax will be located, for example, within the washer sliding area 50B. However, if so, a convex portion of convex and a concave portion, formed in an inner peripheral surface of the thrust washer to enable the lubricating oil to move easily to the outside and inside of the bearing, will tall into the lower hole 52 during sliding movement of the thrust washer. As a result, there is a drawback that the convex portion of the thrust washer and a corner portion of the lower hole 52 will be broken. Moreover, if the convex portion and the corner portion of the lower hole 52 are broken, their broken fragments might fall into gaps of the thrust washer and the bearing, and there is a possibility that the smooth rotation of the pinion will be disturbed. Furthermore, it is also considered to perforate the lower hole 52 by using an end mill having a large diameter. However, as shown in FIG. 9, which is a sectional view taken along the line 9—9 in FIG. 7, the aperture portion of the lower hole 52 (in particular, a portion of a maximum diameter Rmax) will be enlarged, and the lubricating oil entering into the lower hole 52 will easily disperse due to an inertia force to the left and right (or to opposite directions) as shown by the arrows in FIG. 9. It also will be difficult to get the lubricating oil to flow into the internal lubricating oil path 53, resulting in degradation of the lubrication efficiency. In addition, in the case where the end mill 51 has a large diameter, the amount of cutting of the pinion shaft will be increased relatively, and the strength of the pinion shaft 50 will be degraded. Therefore, the diameter of the pinion shaft must be increased.

Furthermore, depending on the position at which the lower hole 52 is formed, it is also considered that the portion having the maximum diameter Rmax is located within the bearing receiving area 50C serving as a rolling surface of a rolling member, and in such a case, the strength of the rolling surface will be varied to a great extent depending on a position in a circumferential direction. For example, a force in a bending direction will be imparted to the rolling member periodically, and the durability of the rolling member will be lowered.

Figure 10:
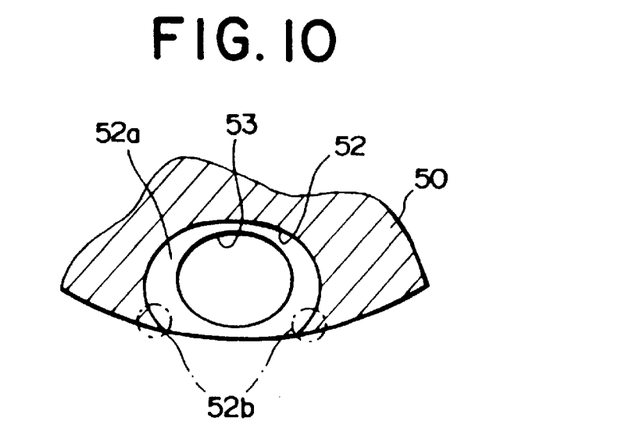
FIG. 10 is a view similar to FIG. 9, where the lower hole has a small diameter.

In order to remove such drawbacks, it is also considered to perforate the lower hole 52 by using an end mill having a small diameter. However, when the lower hole 52 is perforated by using the end mill having a small diameter, as shown in FIG. 10, which is a similar sectional view to FIG. 9, thin wall portions 52b will be formed to the left and right sides of the aperture portion of the lower hole 52, and since the thrust washer slidably moves or the rolling member of the bearing rolls on the thin wall portions 52b, also the pinion shaft 50 will be easily broken.

SUMMARY OF THE INVENTION

The present invention was made in view of the drawbacks in the prior art, and it is an object of the invention to provide a planetary gear and a method for manufacturing the same, which makes it difficult to degrade the lubrication efficiency and break the pinion shaft by improving the structure of the lower hole at which the internal lubricating oil path extending in an oblique direction opens to the outside.

In order to achieve the above-mentioned object, in a first aspect of the invention, in a planetary gear includes a pinion shaft for rotatably supporting a pinion, a lower hole formed in the pinion shaft at a position near an axial end portion of an outer peripheral surface of the pinion shaft, and an internal lubricating oil path within the pinion shaft extending in an oblique direction with respect of an axis line of the pinion shaft and opening at an inner wall surface of the lower hole. The lower hole is formed so that a bottom portion of the lower hole is positioned nearer to an axial end portion of the pinion shaft than an aperture portion of the lower hole.

Furthermore, in a second aspect of the invention, opposite ends of the pinion shaft are respectively supported by carrier plates, and a pair of thrust washers are interposed respectively between the opposite ends of the pinion shaft and the carrier plates, and a radial oil path is formed in each of the carrier plates to extend radially and to communicate with the aperture portion of the lower hole.

Furthermore, in a third aspect of the invention, in a method for manufacturing the planetary gear including a step of forming a lower hole in a pinion shaft at a position near an axial end portion of an outer peripheral surface of the pinion shaft, which rotatably supports a pinion, and a step of forming an internal lubricating oil path opening at an inner wall surface of the lower hole and extending in an oblique direction with respect to an axis line of the pinion shaft, the lower hole is formed so that a bottom portion of the lower hole is positioned nearer to an axial end portion of the pinion shaft than an aperture portion of the lower hole.

Furthermore, in a fourth aspect of the invention, in the method for manufacturing the planetary gear in the third aspect of the invention, the internal lubricating oil path is formed to extend in a direction perpendicular to a working direction for forming the lower hole.

In the first and third aspects of the invention, the lower hole is formed obliquely with respect to the axis line of the pinion shaft. However, the oblique direction is different from that of a generally formed lower hole, and the oblique direction is selected such that the bottom portion of the lower hole is positioned nearer to the axial end portion of the pinion shaft than the aperture portion of the lower hole. As a result, the maximum diameter portion of the aperture portion of the lower hole is formed near the axial end portion of the pinion shaft. Then, the width of the aperture portion of the lower hole at which the thrust washer or the like is fitted around becomes narrow, even when the convex portion is formed on the inner peripheral surface of the thrust washer, the convex portion will not easily fall into the lower hole.

Moreover, even when the lower hole is formed with an end mill having a small diameter and thin wall portions are formed at both right and left sides of the aperture portion, since the thin wall portions are located at positions near the end portion of the pinion shaft, the thin wall portions will be positioned in the inside of the carrier plate or the like holding the end portion of the pinion shaft. Accordingly, the possibility of breaking the thin wall portions will be reduced. If the lower hole is formed to have a small diameter, since the aperture portion can be made narrow, the lubricating oil entering into the lower hole will not easily escape to the outside. Also, since the amount of cutting of the pinion shaft becomes small, the decrease in strength will become minimum.

In this respect, it is desirable that the axis line of the lower hole be perpendicular to the axis line of the oblique part of the internal lubricating oil path. In other words, if both the axis lines are perpendicular to each other, at the time of perforating the internal lubricating oil path into the inner wall surface of the lower hole, the internal lubricating oil path may be perforated by advancing a jig at right angles with respect to the inner wall surface. Thus, even when the jig has a small diameter, the internal lubricating oil path will be perforated easily without bending the jig. In the fourth aspect of the invention, since the internal lubricating oil path is formed to extend perpendicular to a working direction for forming the lower hole, the internal lubricating oil path can be perforated easily.

Furthermore, in the second aspect of the invention, the lubricating oil flowing in the radial oil path formed in the carrier plate enters into the lower hole, and from there, the lubricating oil flows into the internal lubricating oil path. However, when the lower hole is formed to have a small diameter and thus the thin wall portions are formed at both right and left sides of the aperture portion, even when the maximum diameter portion of the aperture portion of the lower hole is positioned to face the radial oil path, the thin wall portions will be located at a portion surrounded by the carrier plate. As a result, the thrust washer will not move sliding on the thin wall portions. Accordingly, it is possible to easily make the maximum diameter portion of the aperture portion of the lower hole face the radial oil path, and hence the lubrication efficiency can be further increased.

Furthermore, when the maximum diameter portion of the aperture portion of the lower hole is positioned to face the radial oil path, since the thrust washer moves sliding on a narrow portion of the aperture portion of the lower hole, the formation of a convex portion having a relatively narrow width is allowed on the inner peripheral surface of the thrust washer.

BRIEF DESCRIPTION OF THE DRAWINGS

The accompanying drawings, which are incorporated in and constitute a part of the specification, illustrate a presently preferred embodiment of the invention, and, together with the general description given above and the detailed description given below, serve to explain the principles of the invention.

DETAILED DESCRIPTION OF THE PREFERRED EMBODIMENTS

An embodiment of the present invention will be described with reference to the drawings. In the figures, like numerals indicate like parts.

Figure 1:
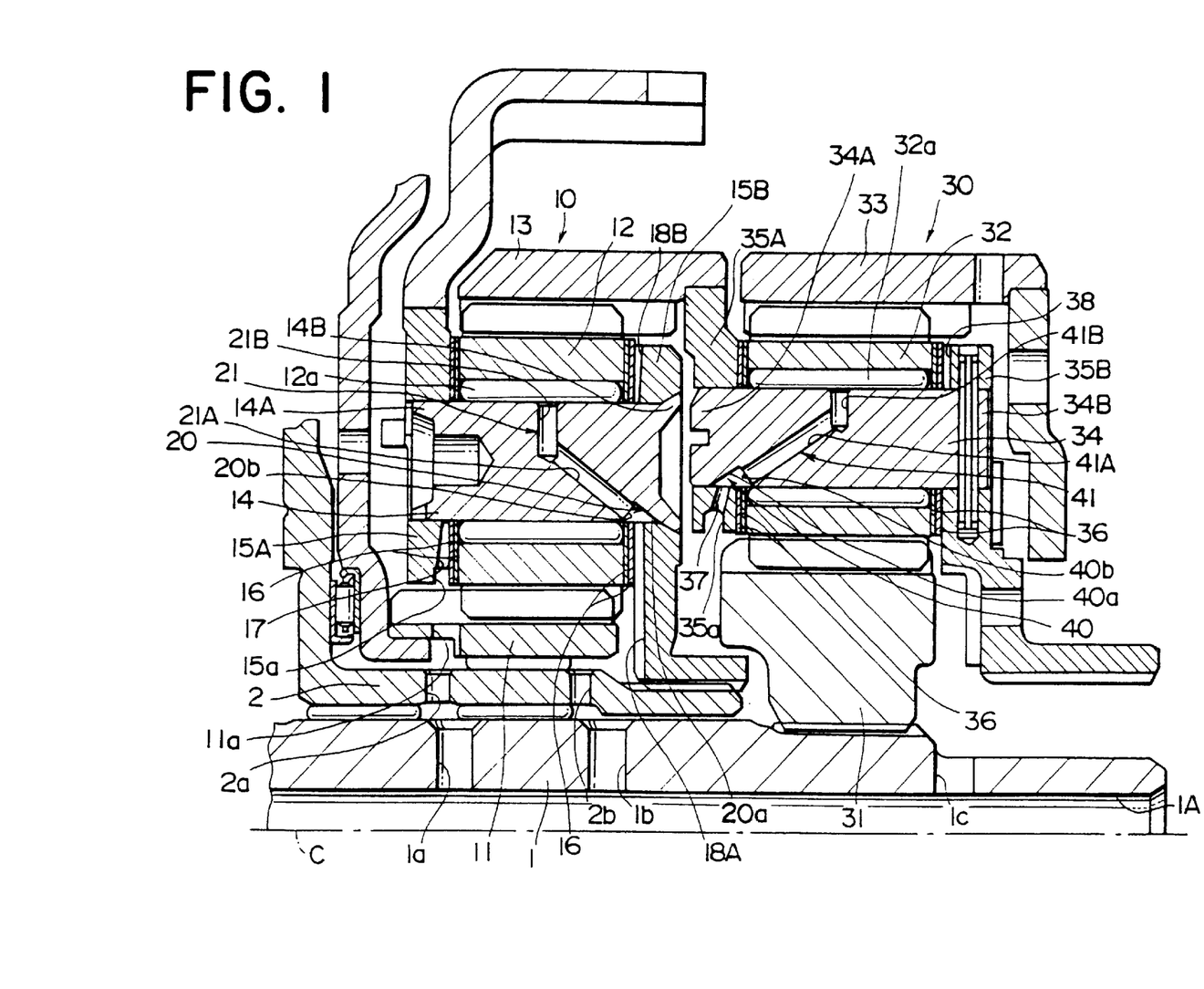
FIG. 1 is sectional view showing a configuration of an embodiment of the present invention.

FIGS. 1 to 4 show an embodiment of the present invention in which FIG. 1 is a partial sectional view of an automatic transmission for a vehicle with a planetary gear according to the present invention.

First, when explaining the configuration, the automatic transmission for a vehicle includes a front planetary gear 10 and a rear planetary gear 30 in a coaxial relation with an axis of rotation C of an input shaft 1.

The front planetary gear 10 includes a sun gear 11, a plurality of pinions 12 (only one is shown in FIG. 1) that engage the sun gear 11, and ring gear 13 that engages each pinion 12. The pinion 12 is fitted around a pinion shaft 14 through a radial needle bearing 12a, and the opposite end portions of the pinion shaft 14 are held respectively by carrier plates 15A and 15B unrotatably relative thereto. The carrier plates 15A and 15B constitute planet carriers. In this regard, the pinion shaft 14 is held by the carrier plates 15A and 15B by caulking the opposite end portions 14A and 14B of the pinion shaft 14 by expanding the opposite end portions radially and outwardly after penetrating the carrier plates 15A and 15B respectively. Furthermore, the caulked portions of the opposite end portions 14A and 14B are prevented from being carburized by coating a carburization preventing agent during carburizing treatment. Furthermore, the inner peripheral surface of the carrier plate 15B near the rear planetary gear 30 is extending to the vicinity of the input shaft 1, and it is spline-coupled with a hub portion 2 of a high clutch (not shown) fitted around coaxially with the input shaft 1 rotatably relatively.

Two thrust washers 16 are interposed between one end surface of the pinion 12 and the carrier plate 15A, and also interposed between the other end surface of the pinion 12 and the carrier plate 15B. Owing to these thrust washers 16 and the radial needle bearing 12a, the pinion 12 is rotatable relative to the pinion shaft 14.

Figure 2:
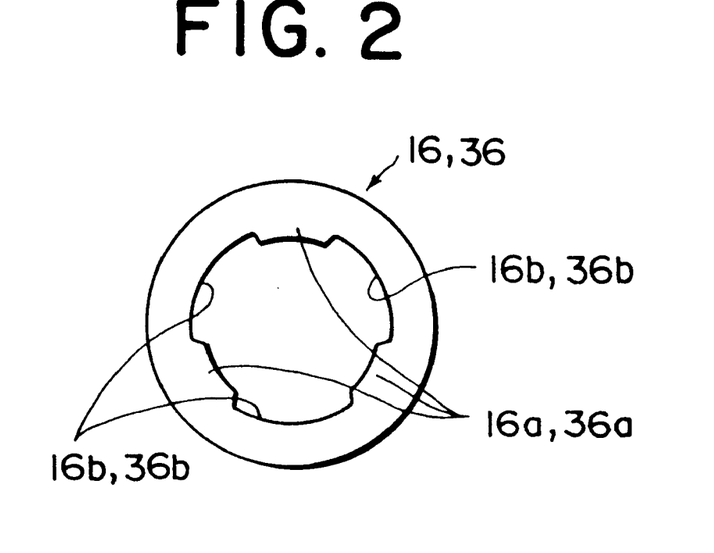
FIG. 2 is a front view of a thrust washer.

The thrust washer 16 is a ring-shaped member as shown in FIG. 2, which is a front view. In the inner peripheral surface, the thrust washer is provided with three convex portions 16a that slidably contact the outer peripheral surface of the pinion shaft 14 and three concave portions 16b that form a gap from the outer peripheral surface of the pinion shaft 14 to allow the lubricating oil to move therethrough. The convex portions and concave portions are arranged alternately.

Moreover, an annular groove 15C is formed continually along a circumferential direction in the inner peripheral surface of the carrier plate 15A near the thrust washer 16, and a radial groove 17 is formed in a vertical surface of the carrier plate 15A adjacent the thrust washer 16 and at a portion of the vertical surface of the carrier plate 15A below the pinion shaft 14 (radially inwardly towards the center axis of rotation C). The radial groove 17 extends radially from the annular groove 15C to the outer peripheral surface of the pinion shaft 14.

Furthermore, a radial groove 18A is formed in a vertical surface of the carrier plate 15B adjacent the thrust washer 16. The radial groove 18A extends radially from the radially inner end portion of the carrier plate 15B to the outer peripheral surface of the pinion shaft 14. Also, a radial groove 18B is formed in the vertical surface of the carrier plate 15B adjacent to the thrust washer 16 and at a portion of the vertical surface extending radially and outwardly from the pinion shaft 14. The radial groove 18B extends radially from the outer peripheral surface of the pinion shaft 14 to an outer radial end surface of the carrier plate 15B.

On the outer peripheral surface of the pinion shaft 14, at a position near the end portion 14B and on a radially inner side, a lower hole 20 is formed having a shape similar to a cross section obtained by cutting a cylinder obliquely with respect to its axis line, so that the lower hole 20 communicates with the radial groove 18A formed in the carrier plate 15B. Also, in the inside of the pinion shaft 14, an internal lubricating oil path 21 is formed, which path communicates with the inside of the lower hole 20 and communicates with the outside of the outer peripheral surface of the pinion shaft 14 at a radially outer side of an axial center portion thereof.

Figure 3:
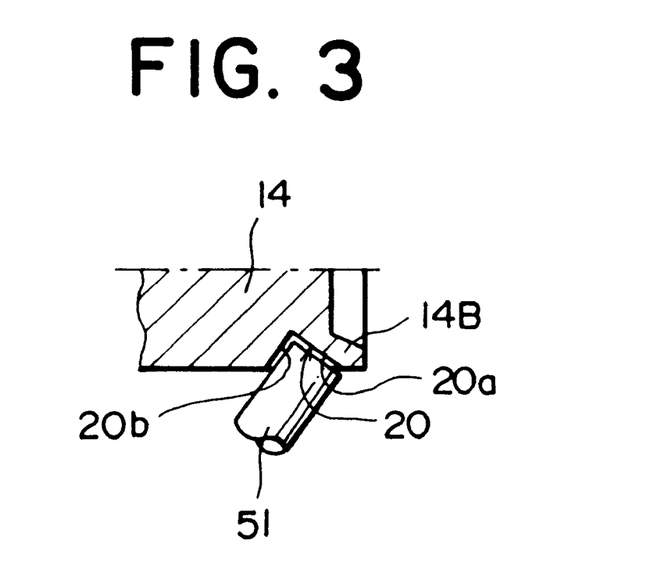
FIG. 3 is sectional view illustrating perforation of a lower hole.

Here, the lower hole 20 is perforated, as shown in FIG. 3, by using an end mill 51. The end mill 51, however, is inserted in an oblique direction so that a bottom portion 20a of the lower hole 20 is positioned nearer to the end portion 14B than an aperture portion of the lower hole 20.

Furthermore, the internal lubricating oil path 21, as shown in FIG. 1, includes a slant oil path 21A that opens at an inner wall or inner peripheral surface of the lower hole 20. The slant oil path 21A extends in an oblique direction toward the axial center portion of the pinion shaft 14. A radial oil path 21B that opens at the axial center portion of the radially outer side of the outer peripheral surface of the pinion shaft 14 and extends radially towards an end portion of the slant oil path 21A to communicate therewith.

In the present embodiment, the axis line of the lower hole 20 (i.e. the axis line of the end mill 51) is substantially perpendicular to the axis line of the slant oil path 21A in a plane containing also the axis line of the pinion shaft 14.

On the other hand, the rear planetary gear 30 includes a sun gear 31 having an inner peripheral side spline-coupled with the input shaft 1, a plurality of pinions 32 (only one is shown in FIG. 1) that engage the sun gear 31, and a ring gear 33 that engages each pinion 32, and the pinion 32 is fitted around a pinion shaft 34 through a radial needle bearing 32a. The opposite ends 34A and 34B of the pinion shaft 34 are held by carrier plates 35A and 35B that constitute a relatively unrotatably Planet Carrier. In this respect, the pinion shaft 34 is held by the carrier plate 35B by coupling the end 34B with the carrier plate 35B by a pin 34C. Also, at the front planetary gear 10 side, the outer peripheral surface of the carrier plate 35A is coupled with an inner peripheral surface of the ring gear 13, and the other carrier plate 35B is spline-coupled with an output shaft (not shown) provided coaxially with the input shaft 1.

Two thrust washers 36 are interposed between one end surface of the pinion 32 and the carrier plate 35A, and also two thrust washers 36 are interposed between the other end surface of the pinion 32 and the carrier plate 35B. Owing to these thrust washers 36 and the radial needle bearing 32a, the pinion 32 is rotatable relative to the pinion shaft 34. The thrust washers 36 have similar configuration as the thrust washers 16 mentioned above.

Moreover, an annular groove 35C is formed continually along a circumferential direction in the inner peripheral surface of the carrier plate 35A, and a radial groove 37 is formed in a vertical surface of the carrier plate 35A adjacent the thrust washer 36 at a portion of the vertical surface of the carrier plate 35A radially inward from the pinion shaft 34. The radial groove 37 extends radially from the annular groove 35C to the outer peripheral surface of the pinion shaft 34. Furthermore, a radial groove 38 is formed in a vertical surface of the carrier plate 35B adjacent the thrust washer 36 at a portion of the vertical surface of the carrier plate 35B radially outward from the pinion shaft 34. The radial groove 38 extends radially from the outer peripheral surface of the pinion shaft 34 to the outer end surface of the carrier plate 35B.

On the outer peripheral surface of the pinion shaft 34, at a position near the end portion 34A and on a radially inner side of the outer peripheral surface of the pinion shaft 34, a lower hole 40 is formed having a shape similar to a cross section obtained by cutting a cylinder obliquely with respect to its axis line, so that the lower hole 40 communicates with the radial groove 37 formed in the carrier plate 35A. Also, in the inside of the pinion shaft 34, an internal lubricating oil path 41 which makes the inside of the lower hole 20 communicate with an axial center portion of the radially outer side of the outer peripheral surface of the pinion shaft 34.

Here, the lower hole 40 is perforated, similar to the lower hole 20, by using an end mill. The end mill is inserted in an oblique direction so that a bottom portion 40a of the lower hole 40 is positioned nearer to the end portion 34A than an aperture portion of the lower hole 40.

Furthermore, the internal lubricating oil path 41, as shown in FIG. 1, includes a slant oil path 41A that opens at an inner wall or inner peripheral surface 40b of the lower hole 40, and extends in an oblique direction toward an axial center portion of the pinion shaft 44. A radial oil path 41B, which opens at an axial center portion of a radially outer side of the outer peripheral surface of the pinion shaft 34, extends radially toward an end portion of the slant oil path 41A to communicate therewith.

In the present embodiment, the axis line of the lower hole 40 is substantially perpendicular to the axis line of the slant oil path 41A in a plane containing also the axis line of the pinion shaft 34.

Furthermore, in the input shaft 1, a lubricating oil supply path 1A is formed in the inside thereof extending coaxially therewith, and at the same time, a plurality of branch oil paths 1B, 1C and 1D are formed respectively opening at the outer peripheral surface of the input shaft 1 through the lubricating oil supply path 1A. Among these branches, the branch oil path 1B is formed at a position covered with the hub 2. However, the lubricating oil discharged from the branch oil path 1B is supplied to a space existing at an inner peripheral portion of the carrier plate 15A through a through hole 2a formed in the hub portion 2 and a through hole 11a formed in the sun gear 11. Also, the branch oil path 1C is formed at a position covered with the hub 2. However, the lubricating oil discharged from the branch oil path 1C, however, is supplied to a gap between the carrier plate 15B and the sun gear 31 through a through hole 2b formed in the hub portion 2. The branch oil path 1D opens at a position opposing an inner peripheral surface of the carrier plate 35B, and the lubricating oil discharged from the branch oil path 1D is supplied to a gap between the sun gear 31 and the carrier plate 35B.

Next, the operation of the present embodiment will be described.

Under a condition where each gear or the like of the front planetary gear 1D and the rear planetary gear 10 is suitably driven into rotation in accordance with a transmission ratio, the lubricating oil in the lubricating oil supply path 1A is discharged to the outside of the input shaft 1 through each of the branch oil paths 1B to 1D due to the influence of a centrifugal force produced by the rotation of the input shaft 1.

The lubricating oil discharged from the branch oil path 1B is supplied into the annular groove 15C at the inner peripheral portion of the carrier plate 15A through the through holes 2a and 11a, and from there, reaches the outer peripheral surface near the end portion 14A of the pinion shaft 14 through the radial groove 17. The thrust washer 16 at the end portion 14A side is lubricated by the lubricating oil reached at the outer peripheral surface, and at the same time, the lubricating oil is supplied also to the radial-needle-bearing (12a) side through a recessed portion 16b at an inner peripheral surface of the thrust washer 16. Hence, the radial needle bearing 12a is also lubricated.

The lubricating oil discharged from the branch oil path 1D reaches the thrust washer 36 at the end-portion (34B) side through the gap between the sun gear 31 and the carrier plate 35B. Thus, the thrust washer 36 is lubricated, and at the same time, since the lubricating oil is supplied also to the radial-needle-bearing (12a) side through a recessed portion 36b of the inner peripheral surface of the thrust washer 36, the radial needle bearing 32a is lubricated.

A part of the lubricating oil discharged from the branch oil path 1C reaches the outer peripheral surface of the pinion shaft 14 through the through hole 2b of the hub portion 2 and the radial groove 18A, while lubricating the thrust washer 16 at the end portion 34B side. However, since the outer end of the radial groove 18A faces the lower hole 20, the lubricating oil passing through the radial groove 18A flows into the lower hole 20, and from there, it is discharged to the outside through the slant oil path 21A and the radial oil path 21B. Thus, the lubricating oil is supplied to an axial center portion of the radial needle bearing 12a, and the lubrication of the radial needle bearing 12a is performed. The lubricating oil after lubricating the radial needle bearing 12a, is discharged to the ring gear 13 side through the radial groove 18B under the influence of the centrifugal force, while lubricating the thrust washer at the end portion 14A side and at the end portion 14B side.

Furthermore, a part of the lubricating oil discharged from the branch oil path 1C flows towards the sun gear 31 through a gap between the outer peripheral surface of the input shaft 1 and the inner peripheral surface of the hub portion 2, and flows into a gap between the carrier plate 15B and the sun gear 31 turning around the end portion of the hub portion 2. Then the lubricating oil flows into the lower hole 40 passing through the annular groove 35C in the inner peripheral surface of the carrier plate 35C and the radial groove 37, and at the same time lubricates the thrust washer 36 at the end portion 34A side. The lubricating oil entering into the lower hole 40 is discharged to the outside of the pinion shaft 34 through the slant oil path 41A and the radial oil path 41B. Thus, the lubricating oil is supplied to an axial center portion of the radial needle bearing 32a to lubricate the radial needle bearing 32a. After lubricating the radial needle bearing 32a, the lubricating oil is discharged to the ring gear 33 side through the radial groove 38 and the like, under the influence of the centrifugal force while lubricating the end portion 34A side and the end portion 34B side.

As described above, in the present embodiment, since the radial grooves 17, 18A and the internal lubricating oil paths 21, 41, and the like are suitably formed, it is possible to satisfactorily lubricate the radial needle bearings 12a, 32a and the thrust washers 16, 36 which are difficult to lubricate because they are surrounded by the ring gears 13, 33 and the carrier plates 15A, 15B, 35A, 35B.

Figure 4:
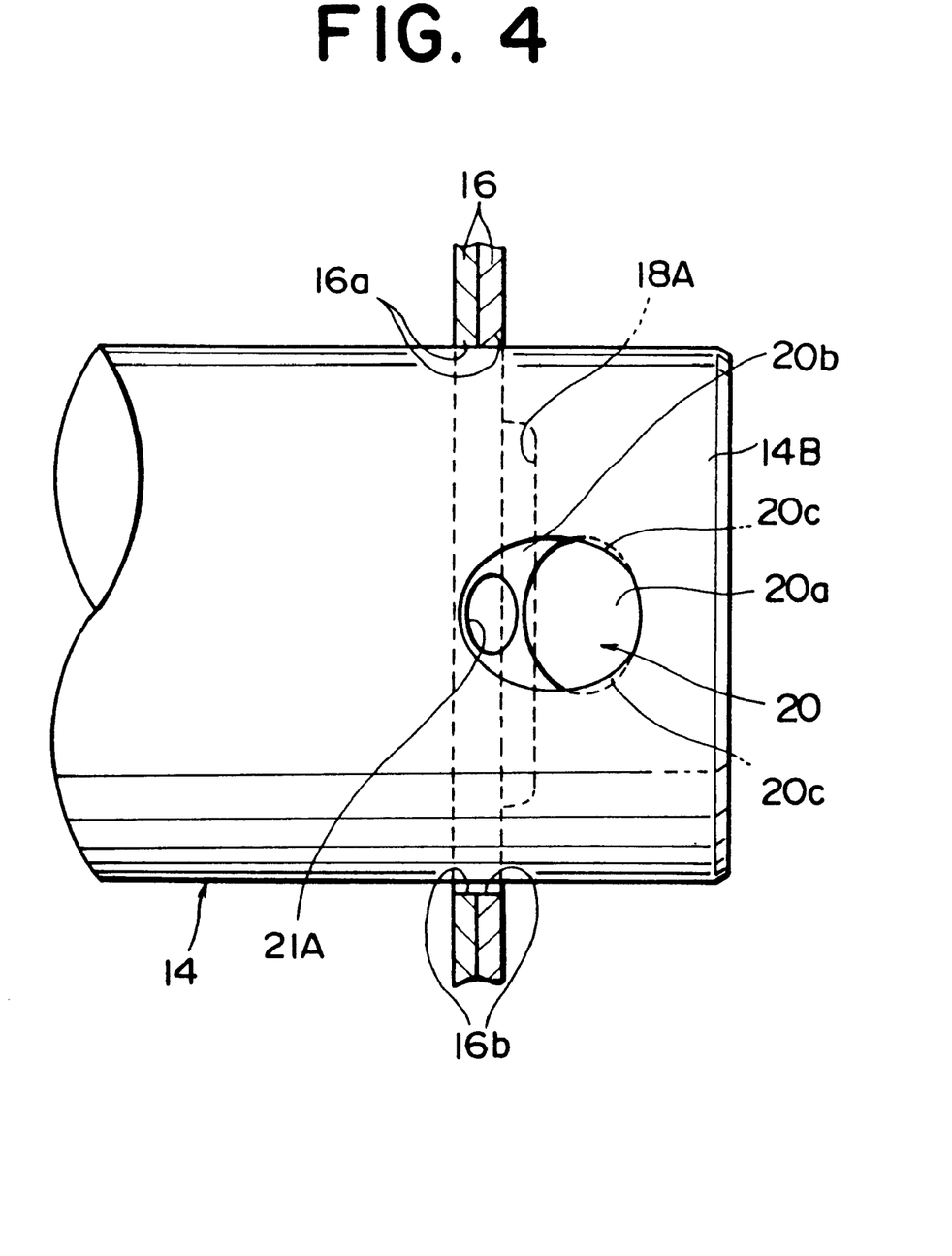
FIG. 4 is a front view of a pinion shaft with partial enlargement.

Furthermore, in the present embodiment, since the lower holes 20, 40 at which the slant oil paths 21A, 41A open are formed in the oblique direction as described above, the following advantages are provided. Since the advantages of the lower holes 20 and 40 are similar to each other, the advantages of the lower hole 20 will be explained, and those of the lower hole 40 are omitted. Specifically, when the lower hole 20 is formed with its axis line inclined with respect to the axis line of the pinion shaft 14, as shown in FIG. 4, which is a front view of a peripheral portion of the pinion shaft 14 in which the lower hole 20 is formed (or viewed upwardly in FIG. 1). The bottom portion 20a (which is at right angles with respect to the axis line of the lower hole 20) is positioned near the end portion 14B of the pinion shaft 14, and hence an aperture (circumferential) width of the lower hole 20 at a portion around which the thrust waher 16 is fitted becomes narrow. Thus, it is possible to prevent the convex portion 16a of the thrust washer 16 from falling into the lower hole 20 while the thrust washer 16 is moving slidably on the outer peripheral surface of the pinion shaft 14, without requiring enlargement of a circumferential width of the convex portion 16a to a great extent. If it is not necessary to enlarge the width of the convex portion 16a of the thrust washer 16, it is possible to enlarge a circumferential width of the concave portion 16b relative to the convex portion 16a. As a result, the advantage is offered in that the movement of the lubricating oil to move out and in through the concave portion 16b becomes smooth, and the lubrication efficiency with respect to the thrust needle bearing 12a is improved.

Moreover, when the bottom portion 20a of the lower hole 20 is positioned near the end portion 14B of the pinion shaft 14, the thin wall portions 20c, which are formed at opposite sides of the aperture portion of the lower hole 20 at the time of perforating the lower hole 20 with an end mill 51 having a small diameter, are also positioned in the inside of a portion surrounded by the carrier plate 15B. Then, since the pinion shaft 14 and the carrier plate 15B are unitary in the direction of rotation, the carrier plate 15B never moves slidably on the thin wall portions 20c and the thin wall portions 20c never receive impact of the sliding movement. As a result, the possibility of breakage of the thin wall portions 20c is very small.

Furthermore, when the lower hole 20 is perforated with an end mill 51 having a small diameter, since the width of the aperture portion becomes narrow, the advantage is offered in that the lubricating oil, once it has fallen into the lower hole 20 from the radial groove 18A becomes difficult to move to the outside, and the flow rate of the lubricating oil into the internal lubricating oil path 21 is ensured and good lubrication can be achieved. Further, if the lower hole 20 has a small diameter, the amount of cutting of the pinion shaft 14 is reduced and the degrdation of the strength is also minimal.

In addition, since the axis line of the lower hole 20 is perpendicular to the axis line of the slant oil path 21A, at the time of perforating the slant oil path 21A into the inner peripheral surface (inner wall) of the lower hole 20, a jig may be applied to the inner peripheral surface at right angles. Thus, the slant oil path 21A can be perforated reliably even when a jig having a small diameter is used, and the slant oil path 21A can be finished with high precision.

Figure 5:
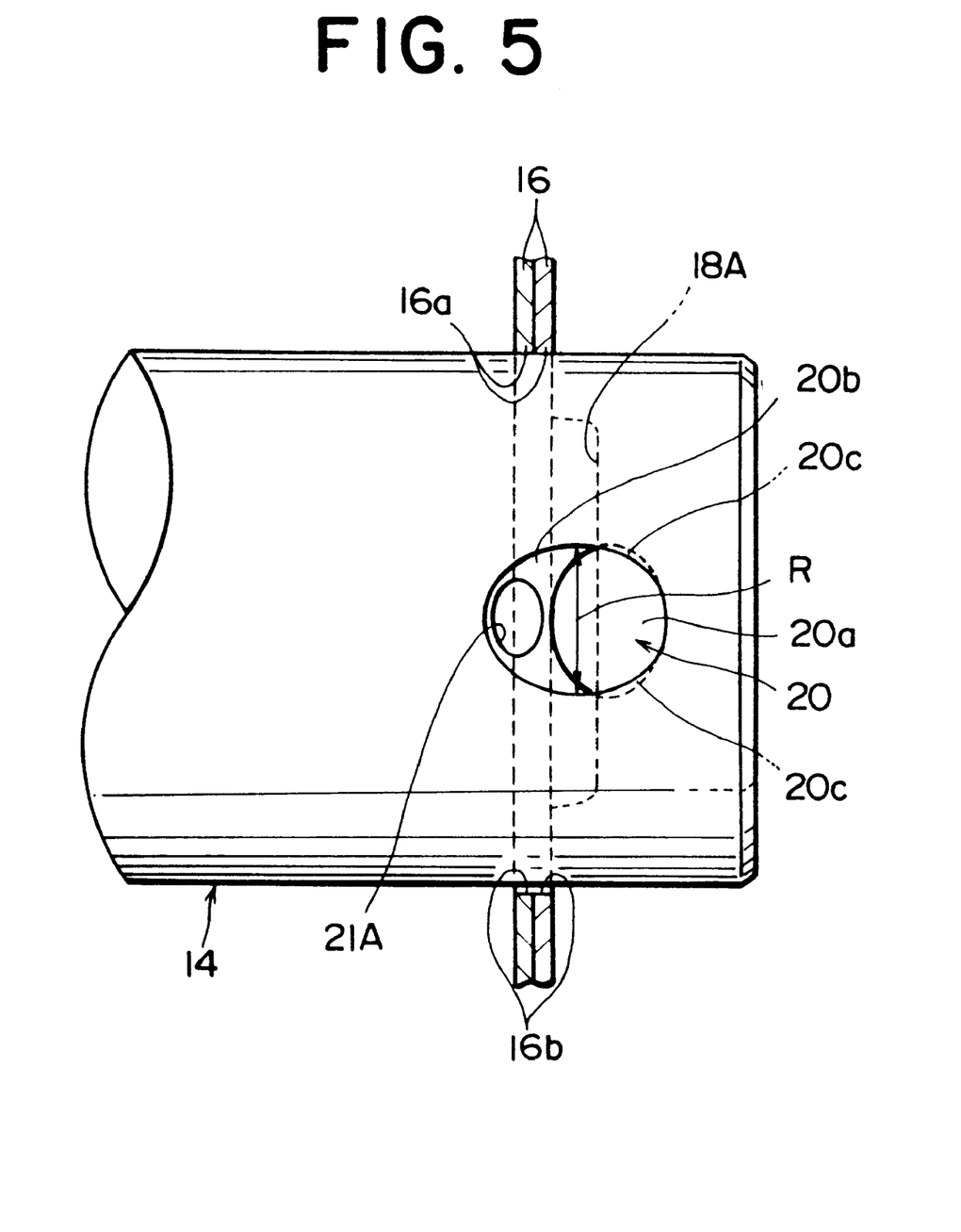
FIG. 5 is a front view of a pinion shaft with partial enlargement in another example.

Furthermore, since the lubricating oil flowing radially and outwardly in the radial groove 18A enters into the lower hole 20, and from there, the lubricating oil flows into the slant oil path 21A, from the view point of the lubrication efficiency, as shown in FIG. 5, it as desirable that the radial groove 18A be made to face a portion of the aperture portion having a maximum diameter Rmax of the lower hole 20. On the other hand, the thin wall portions 20c are positioned at a portion surrounded by the carrier plate 15B as described earlier, and the carrier plate 15B never slides on the thin wall portions 20c. As a result, it is possible to make the the radial groove 18A face the portion of the aperture portion having a maximum diameter Rmax of the aperture portion of the lower hole 20, and to increase the lubrication efficiency. In this case, if it is possible to make the radial groove 18A face the portion of the aperture portion having a maximum diameter Rmax of the aperture portion of the lower hole 20, the thrust washer 16 will move slidably on a narrow portion of the aperture of the lower hole 20, and the width of a circumferential direction of the convex portion 16a of the thrust washer 16 can be narrowed certainly. That is, the configuration in the present embodiment is a very suitable configuration in actual designing.

Figure 6:
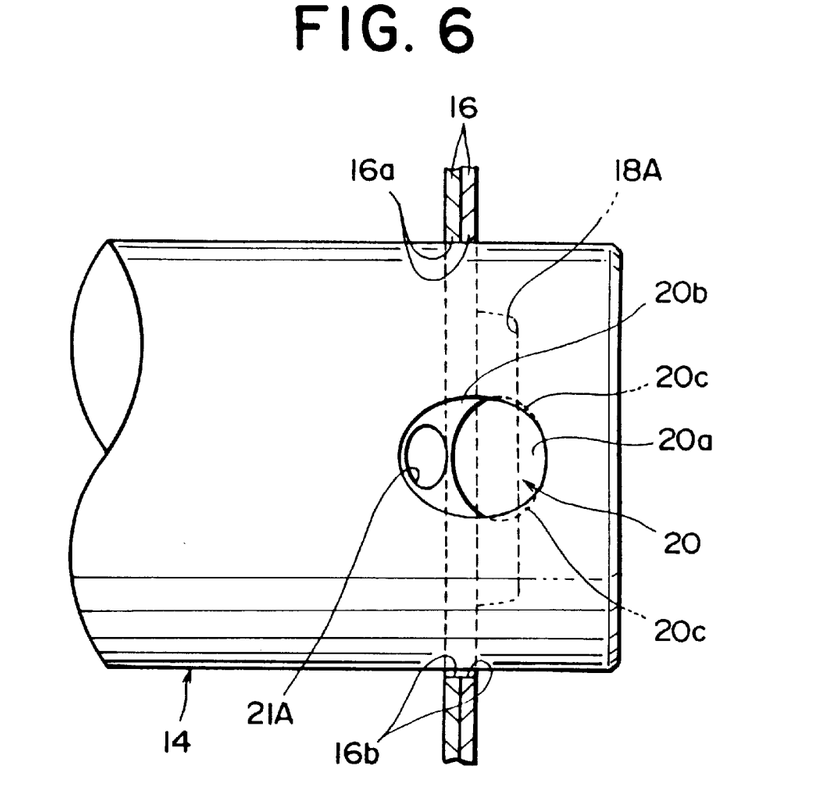
FIG. 6 is a front view of a pinion shaft with partial enlargement in still another example.

In this regard, the positional relation between the radial groove 18A and the lower hole 20 is not limited to the positional relation shown in FIGS. 4 and 5. For example, as shown in FIG. 6, a part of the radial groove 18A may be overlapped with the thin wall portions 20c. Also in such a positional relation, since the thrust washer 16 never moves slidably on the thin portions 20c, the possibility of breaking the thin portions 20c is very small.

Furthermore, even when any of the configurations shown in FIGS. 4 to 6 is employed, since the radial needle bearing 12a never makes a portion including the thin wall portions 20c and a portion having a maximum diameter Rmax as being a rolling surface, it is possible to reduce a change of stress received by a rolling member of the radial needle bearing 12a to zero or to an extremely small value. It is thus possible to limit the degradation of the durability a minimum.

In the embodiment described above, two thrust washers 16, 16 and 36, 36 are used at each designated position. However, the invention is not limited to this, and one thrust washer may be used at each designated position. Also, in the embodiment described above, the thrust washers 16 and 36 having the convex portions 16a and 36a are used. However, a thrust washer having no convex portion is also applicable.

In the embodiment described above, the internal lubricating oil paths 21 and 41 are respectively constituted by the slant oil path 21A and the radial oil path 21B, and by the slant oil path 41A and the radial oil path 41B. However, the invention is not limited to this, and end portions of the slant oil paths 21A, 41A opposite to the lower holes 20, 40 may be opened directly at the outer peripheral surfaces of the pinion shafts 14, 34.

Furthermore, in the embodiment described above, it is described for the case where the planetary gear according to the present invention is applied to an automatic transmission for a vehicle. However, the application object of the present invention is not limited to this, and the planetary gear according to the present invention may be applied to other apparatus. Other embodiments of the planetary gear of the present invention will be apparent to those skilled in the art from consideration of the specification disclosed herein. It is intended that the specification be considered as exemplary only, with the true scope and spirit of the invention being indicated by the following claims.

The advantages of the present invention may be briefed as follows. As described in the foregoing, in the present invention, the lower hole, which is formed beforehand at the time of perforating the internal lubricating oil path within the pinion shaft, is formed obliquely with respect to the axis line of the pinion shaft so that the bottom portion of the lower hole is positioned nearer to the axial end portion of the pinion shaft than to the aperture portion. The internal lubricating oil path is made to open at the inner wall surface of the lower hole. As a result, even when thin wall portions are formed at the aperture portion of the lower hole, the thin wall portions are not easily broken, and at the same time, the lubrication efficiency is improved. Further, the amount of cutting of the pinion shaft is reduced and the degradation of its strength is held to a minimum.

We claim:

1. A planetary gear comprising:

a pinion shaft for rotatably supporting a pinion;

a lower hole formed in an outer peripheral surface of the pinion shaft at a position near an axial end portion of the pinion shaft; and an internal lubricating oil path within the pinion shaft extending in an oblique direction with respect to an axis of the pinion shaft and having an end portion opening at an inner wall surface of the lower hole, wherein a bottom portion of the lower hole is positioned nearer to the axial end portion of the pinion shaft than an aperture portion of the lower hole, and wherein the end portion of the internal lubricating oil path opening at the inner wall surface is at an axial end side of the pinion shaft, and the inner wall surface has a cylindrical shape.

2. A planetary gear according to claim 1, further comprising carrier plates and a thrust washer, wherein the carrier plates support opposite ends of the pinion shaft and the thrust washer is interposed between one end of the pinion and one of the carrier plates, and further including a radial oil path formed in the carrier plate and extending radially and communicating with the aperture portion of the lower hole.

* * * * *